(12) United States Patent
Smith

(10) Patent No.: US 6,658,487 B1
(45) Date of Patent: Dec. 2, 2003

(54) COLLECTION OF EVENTS WITHIN A DISTRIBUTED OBJECT SYSTEM

(75) Inventor: Christopher Smith, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/043,147

(22) PCT Filed: Mar. 25, 1997

(86) PCT No.: PCT/GB97/00834

§ 371 (c)(1),
(2), (4) Date: Mar. 13, 1998

(87) PCT Pub. No.: WO97/37304

PCT Pub. Date: Oct. 9, 1997

(30) Foreign Application Priority Data

Mar. 29, 1996 (GB) ............................................. 9606733

(51) Int. Cl.$^7$ ................................................ G06F 9/54
(52) U.S. Cl. ........................................ 709/318; 709/316
(58) Field of Search .................. 709/310–318, 709/330; 717/1–10, 100–116

(56) References Cited

U.S. PATENT DOCUMENTS

| 5,734,903 | A | * | 3/1998 | Saulpaugh et al. | ......... 709/303 |
|---|---|---|---|---|---|
| 5,774,669 | A | * | 6/1998 | George et al. | ............... 709/224 |
| 5,822,527 | A | * | 10/1998 | Post | ........................... 709/206 |
| 5,935,219 | A | * | 8/1999 | Holmes | ...................... 709/303 |
| 6,212,676 | B1 | * | 4/2001 | Seaman et al. | ................. 717/4 |

FOREIGN PATENT DOCUMENTS

| EP | 377 299 | 7/1990 |
|---|---|---|
| WO | 95 31780 | 11/1995 |

OTHER PUBLICATIONS

ICSI '92. Proceedings of the Second International Conference on Systems Integration, Morristown, NJ, USA Jun. 15–18, 1992, Los Alamitos, CA, USA, IEEE Comput. Soc. Press, USA, pp. 104–113, Berre, "COOP–an object oriented framework for systems integration".

* cited by examiner

Primary Examiner—St. John Courtenay, III
Assistant Examiner—George Opie
(74) Attorney, Agent, or Firm—Nixon & Vanderhye P.C.

(57) ABSTRACT

A Distributed Object System includes an Event Collection Mechanism (14) which receives information on the creation, deletion and actuation of objects within the system. The Event Collection Mechanism passes on the collected events to an Event Dispatch Mechanism (16) with which user applications may register. The Event Dispatch Mechanism forwards details of events to the User Applications, according to the criteria selected by the user. A method is provided for linking all reported events back to the object which was ultimately responsible for their creation.

20 Claims, 7 Drawing Sheets

COLLECTION OF EVENTS WITHIN A DISTRIBUTED OBJECT SYSTEM

BACKGROUND OF THE INVENTION

1. Field of the Invention

The present invention relates to the collection of events within a Distributed Object System.

2. Description of Related Art

Distributed Computing is an area of computing in which distinct software modules running on physically separate computing nodes can communicate with each other, and can request each other to perform tasks. The development of object-oriented technology has given Distributed Computing extra impetus in recent years and the convergence of the two technologies has resulted in Distributed Object Technology.

As the number and complexity of these objects has increased, so have the problems involved in establishing exactly what is happening in such a system. Although a number of software support tools are available to system designers and maintainers, they are currently rather unsatisfactory. Various tools are currently available, for example, for debugging conventional "single process" software, allowing developers to step through the code in the software and to inspect the state of the program. There are also one or two tools applicable to object-orientated programming that enable programmers to "visualise" objects within conventional software by showing the creation and deletion of objects.

Difficulties arise, however, since such conventional tools are really not sufficiently powerful or flexible for the needs of designers and maintainers of large Distributed Object Systems.

SUMMARY OF THE INVENTION

According to a first aspect of the present invention there is provided a Distributed Object System having a plurality of objects, each object having an associated filter, the filter being arranged to intercept messages sent or received by its corresponding object and to forward information representative of said messages to an Event Collector.

The invention also extends to a corresponding method, and in particular extends, in a second aspect of the invention, to a method of characterising a Distributed Object System having a plurality of objects, the method comprising providing each object with an associated filter which is arranged to intercept messages sent or received by its corresponding object and to forward information representative of said messages to an Event Collector, the Distributed Object System being characterised according to the messages received by the Event Collector.

The messages collected by the Event Collector may be representative of a predefined class of events, for example the class of interactions between objects and the deletion and creation of objects, Preferably, the Event Collector may forward collected events to an Event Dispatch Mechanism, which processes the events and forwards them to one or more User Applications. These User Applications may take a variety of different forms, including Visualizer Applications. Fault Detecting Applications. Control Applications and Charging Applications. In a preferred embodiment, several different User Applications (objects) may be running simultaneously, and each may be independently configurable. Depending upon the particular requirements, the configuration may be automatic or user-defined.

In one form, the invention may provide a mechanism for creating a stream of events, where each event consists of either the transmission of a message from one object to another, or the creation or deletion of an object. The system may be installed without intrusive changes to the code of the object themselves. Furthermore, it may allow more than one individual to visualise interactions in the system at any one time, allowing each individual to see only the actions that are relevant.

Alternatively, in another embodiment the system may provide fault reporting and/or fault recovery services within a Distributed Object System.

The system accordingly provides a tool or series of tools which can collect information, in a well defined way, from the various objects within a Distributed Object System. The information thus collected may then be used to analyse the system, for example to find out what has happened during a system failure or other unexpected event. Equally importantly, the information collected may be used to assist system designers who are attempting to explain the system to other people who are not directly involved in development. Conventionally, Distributed Object Systems are extremely difficult to explain, and the present invention in at least some forms, will improve the "information transfer" process from developers and designers to technical collaborators and customers.

BRIEF DESCRIPTION OF THE INVENTION

The invention may be carried into practice in a number of ways and one specific distributed object system incorporating the invention will now be described, by way of example, with reference to the accompanying drawings, in which.

Figure 6:
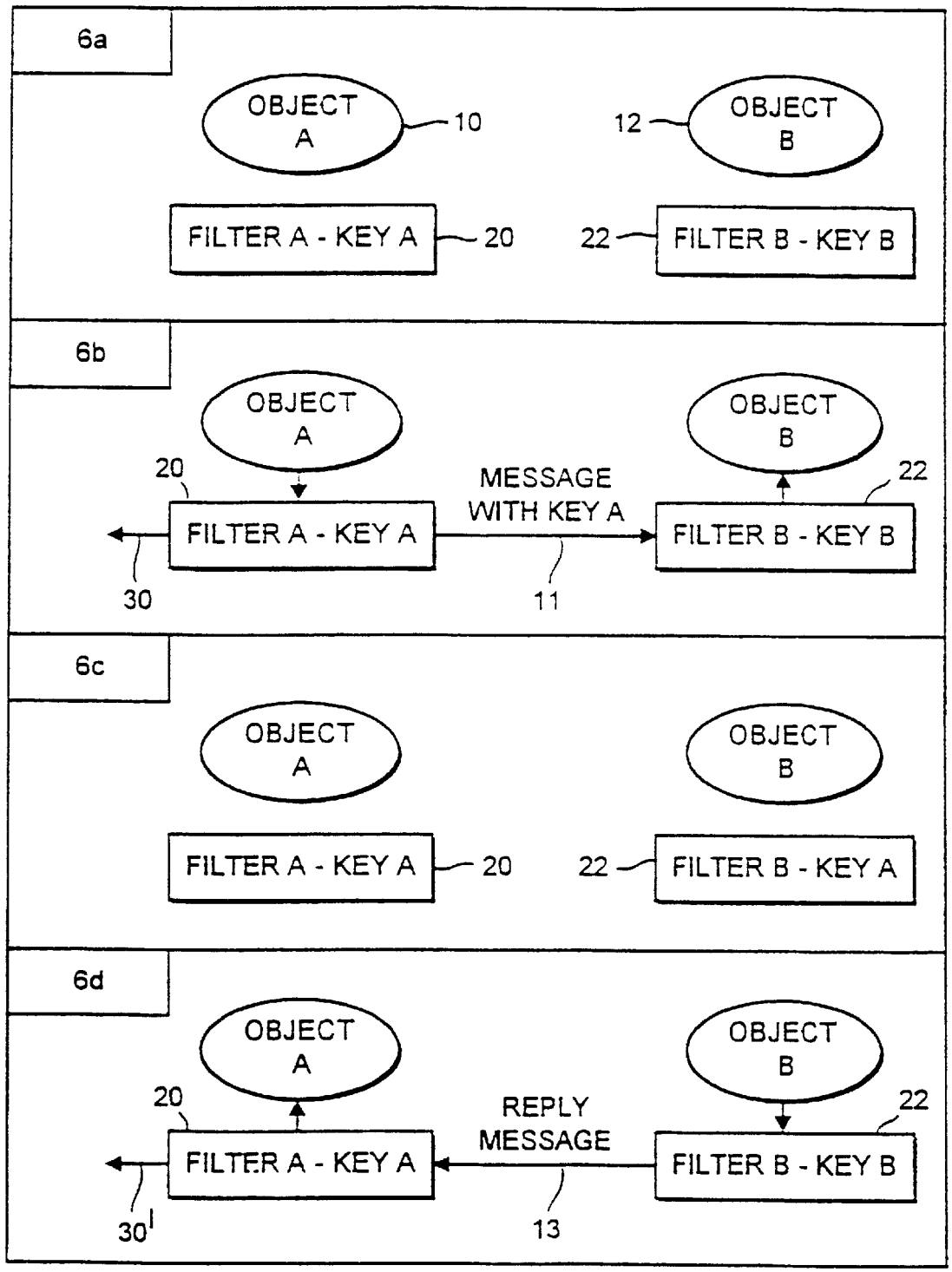
FIG. 6 shows how messages with keys are sent between objects.
Figure 7:
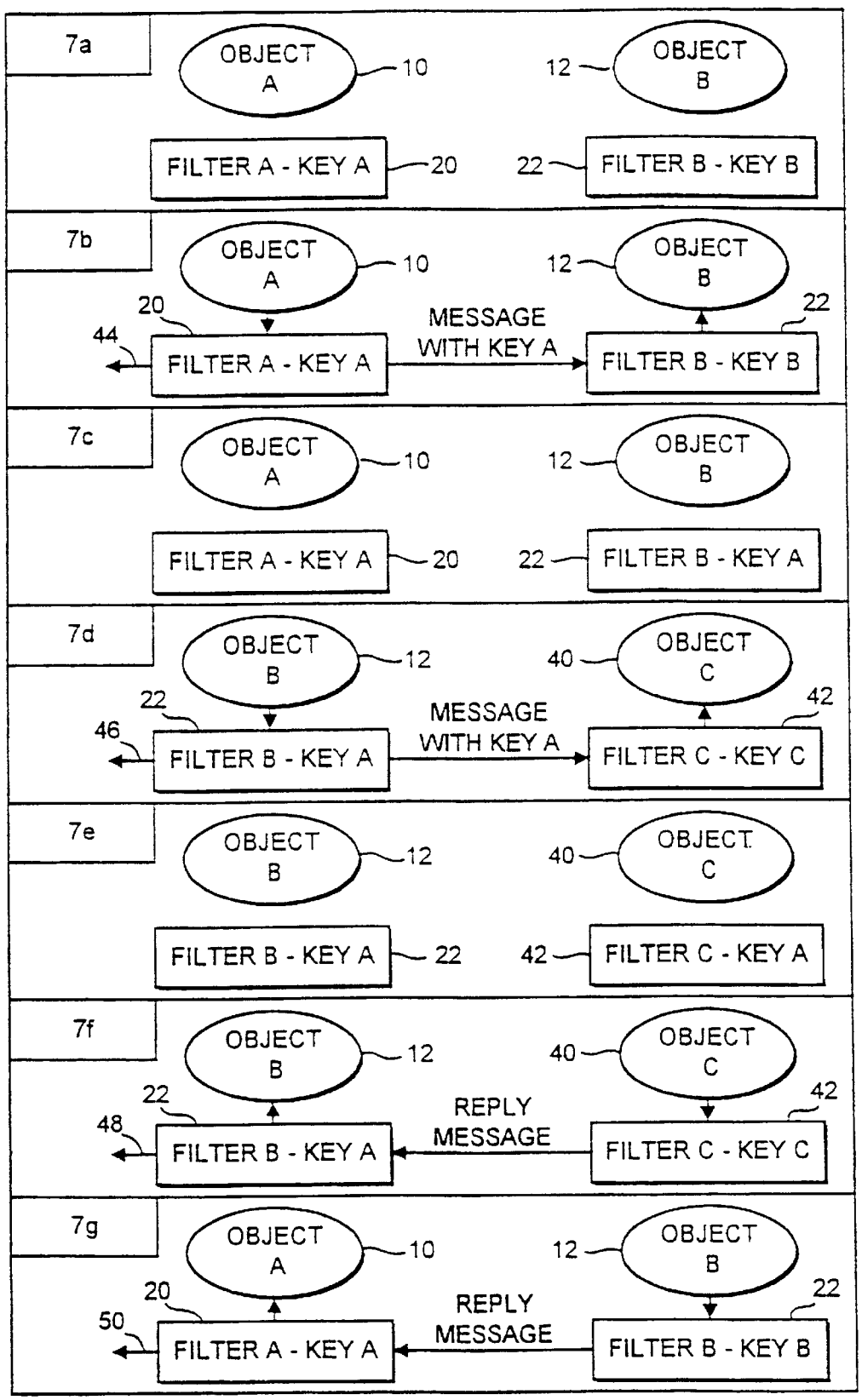
Figure 8:
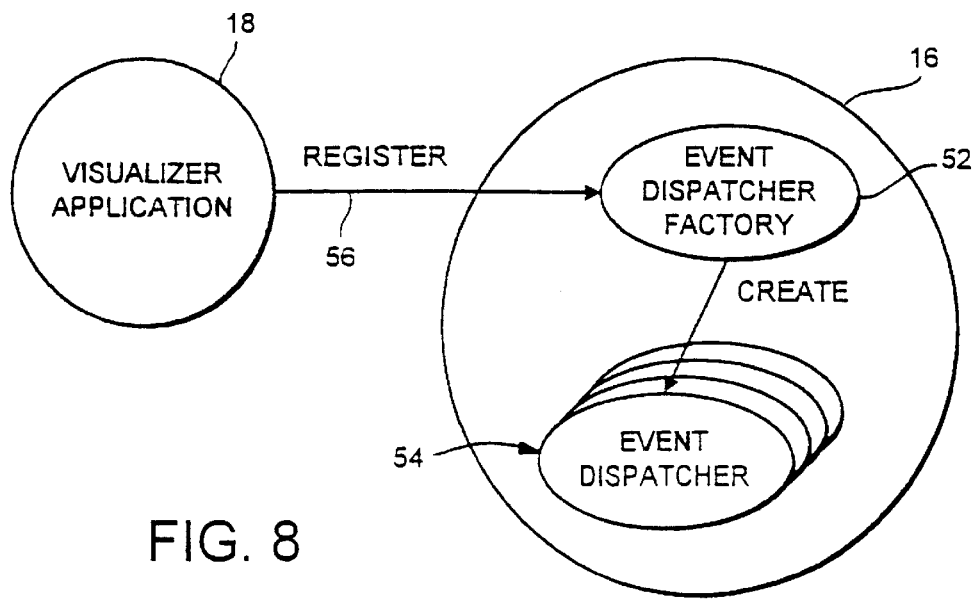
Figure 9:
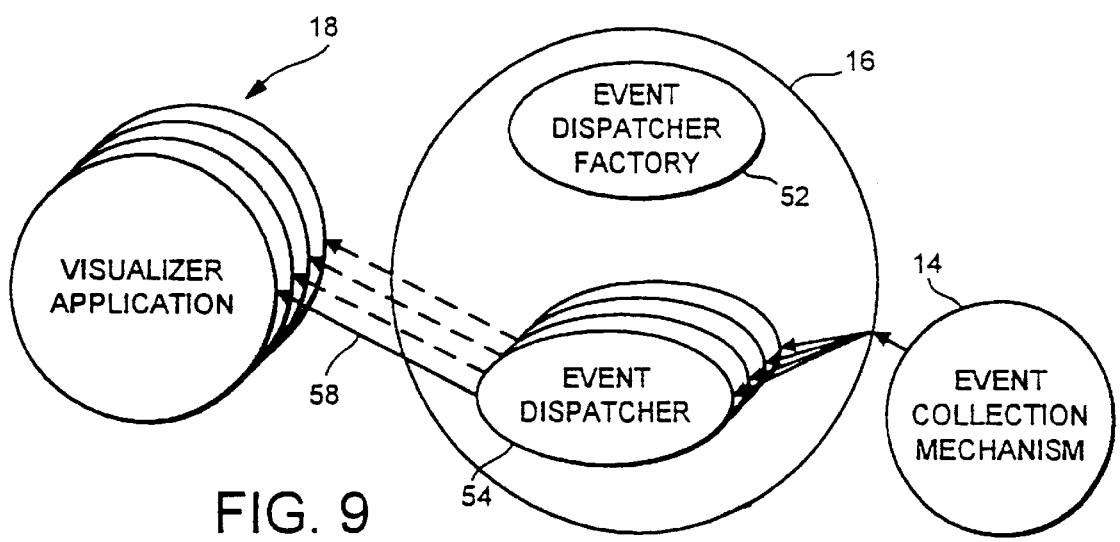
Figure 10:
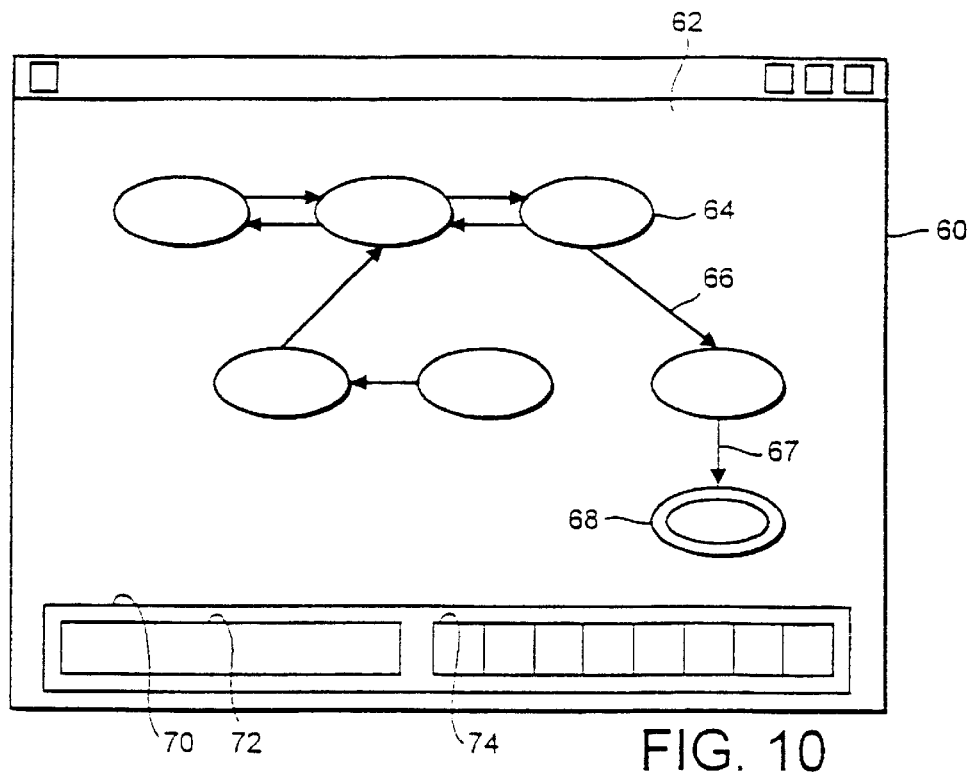
Figure 11:
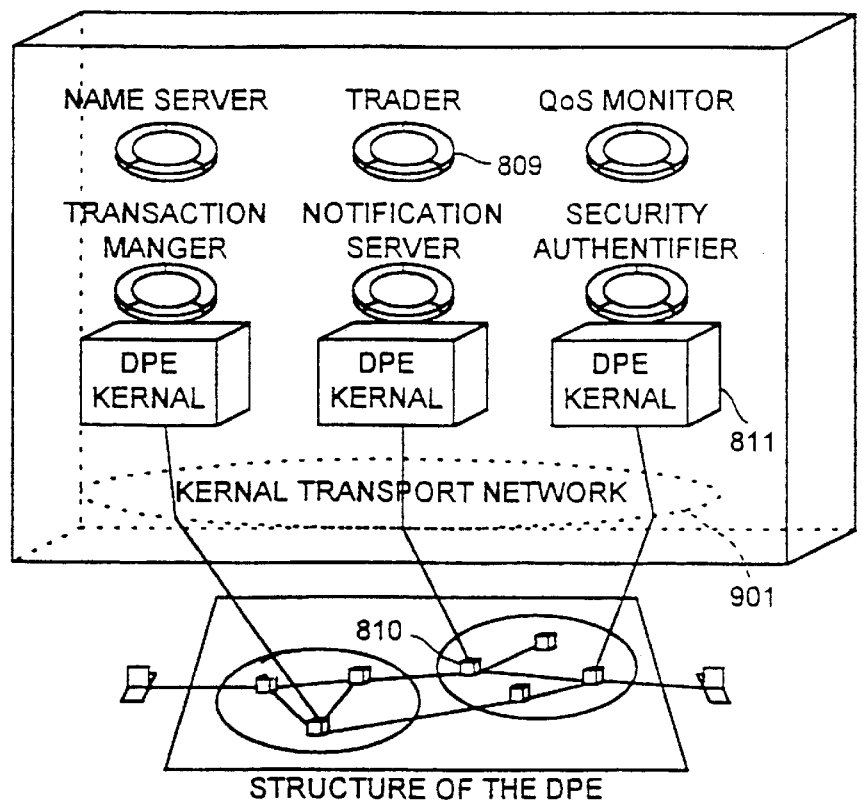
Figure 12:
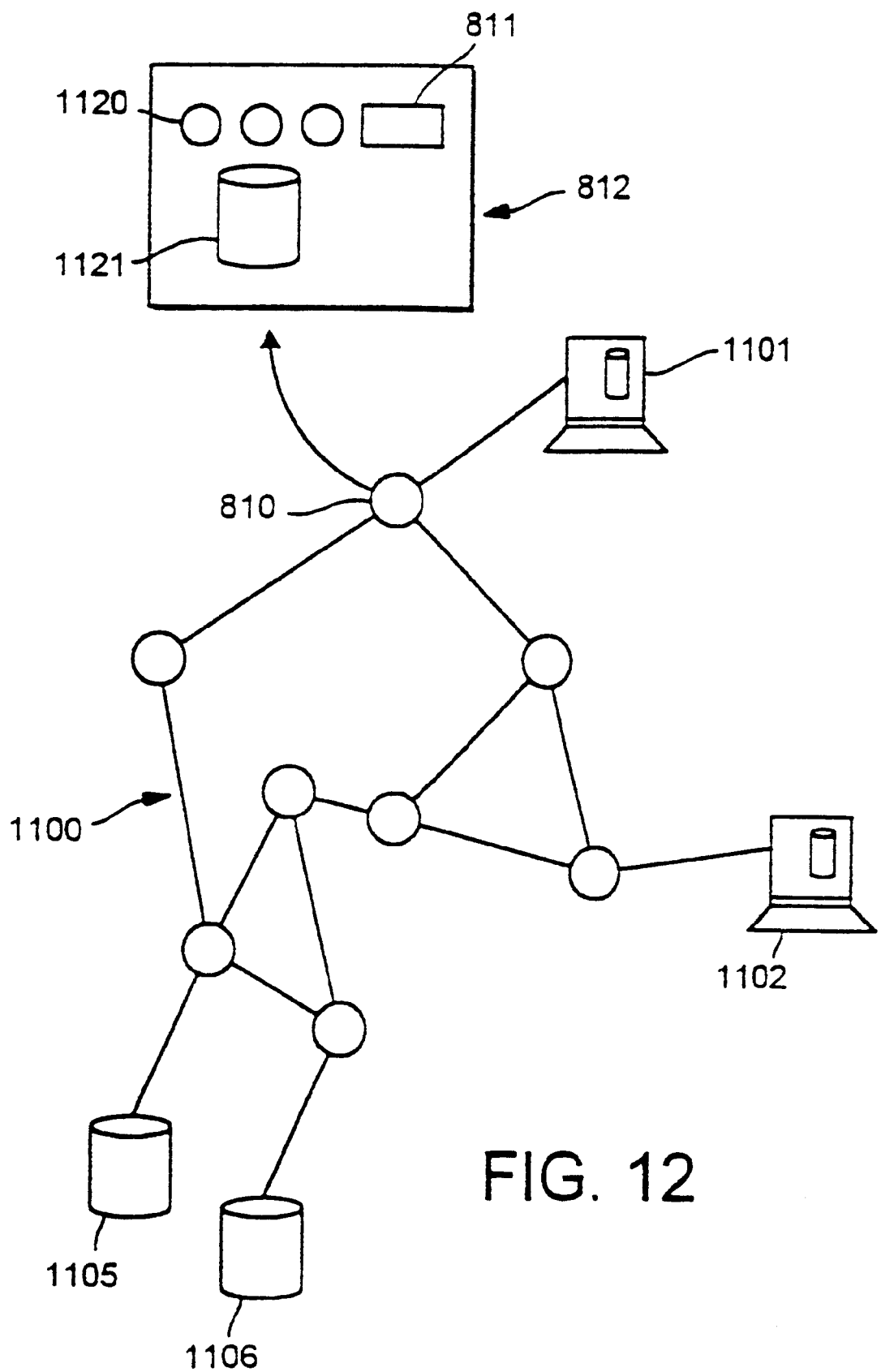

FIG. 7 corresponds to FIG. 6, but shows the interaction with an additional object;

FIG. 8 shows how the preferred visualizer application registers with the event dispatch mechanism;

FIG. 9 shows the event dispatch mechanism forwarding information to the visualiser application;

FIG. 10 shows an exemplary screen shot from the preferred visualization application;

FIG. 11 shows an exemplary structure for a distributed processing environment (APE) that may be used in association with the present invention; and FIG. 12 shows a hardware view of a platform for use with embodiments of the present invention.

DESCRIPTION OF EXEMPLARY EMBODIMENTS

Before describing the preferred embodiment of the present invention, it may be useful to set out some general background information on Distributed Processing Environments (DPEs) generally.

A large number of DPEs conform to a de-facto standard called the Common Object Request Broker Architecture (CORBA). The CORBA standard was created by the Object Management Group (OMG) which is an international consortium comprising a large number of computer companies, software vendors and other interested parties.

Figure 1:
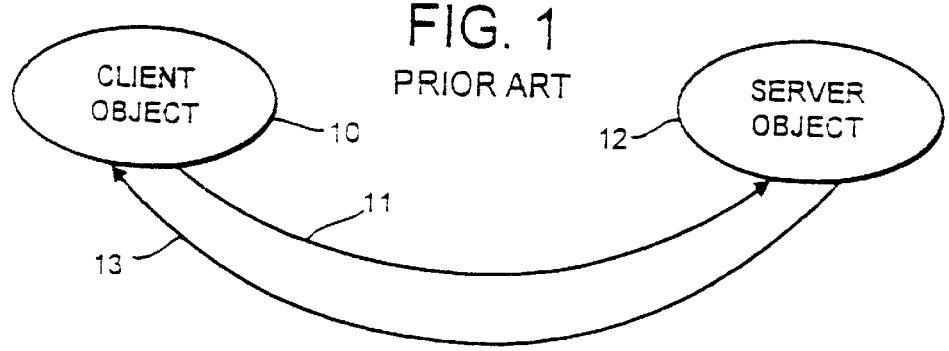
FIG. 1 illustrates the Remote Procedure Call in a distributed processing environment.

Most DPEs use a style of interaction called the Remote Procedure Call (RPC), illustrated generally in FIG. 1. In the RPC model, a client object 10 sends a message 11 to a remote server object, requesting a particular operation. The server object 12 executes the code which corresponds to this operation, and then returns control to the client 10 by means of a reply message 13. Typically, the outgoing message 11 contains the name of the operation to be invoked along with the arguments to the operation, while the reply message contains the name of the operation that was invoked along with the results of the operation.

There are other interaction styles, but most may be thought of as being derived from the conventional RPC model. For example, an alternative interaction style used in CORBA is the "one-way" style. In this model, the message to invoke an operation is sent to the server object, but in the meantime the client object continues to execute its own code. When the server object completes the execution of the operation concerned, no message is sent back. This may be viewed simply as a conventional RPC in which there are no results, and in which no confirmation is sent back from the server object to the client object.

Figure 2:
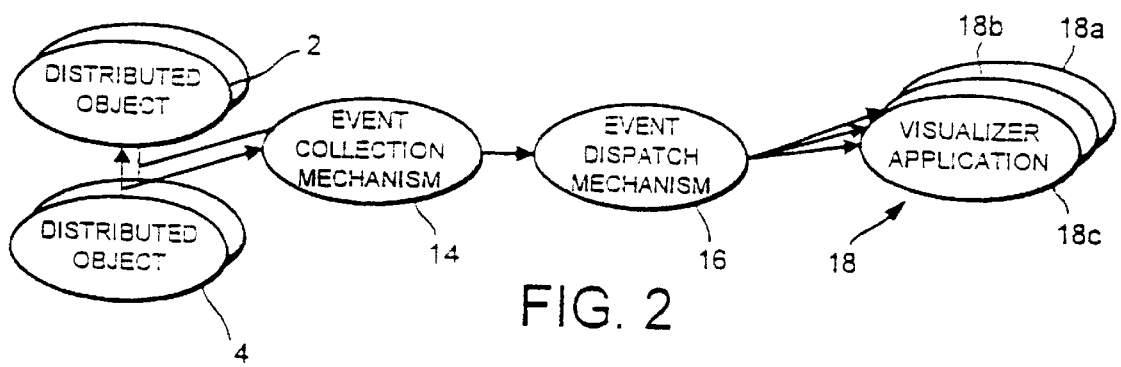
FIG. 2 shows and overview of the system according to the preferred embodiment of the present invention.

Turning now to FIG. 2, there is shown an overview of the preferred embodiment of the present invention. The exemplary system is implemented by means of three main subsystems. The first subsystem 14 is an Event Collection Mechanism, concerned with the collection of events which arise from the creation and deletion of objects and the interactions between them. As may be seen from the drawing, the Event Collection Mechanism receives information from a plurality of distributed objects 2,4 which may be widely spaced within the computing environment. For example, one object may be running on one physical computer and another on another physical computer connected to the first by a conventional local area network or even a wide area network. The second subsystem 18 takes the form of a Visualizer Application which allows users of the system to view the interactions, configure the way in which they view the interactions, and decide which interactions to view. Several visualizer applications 18a, 18b, 18c may be operational at one time. The third and final subsystem comprises an Event Dispatch Mechanism 16; this takes the stream of events from the collection mechanism 14 and dispatches it to each of the individual Visualizer Applications 18a, 18b, 18c. It will be understood, of course, that the Event Collection Mechanism 14, the Event Dispatch Mechanism 16 and the Visualizer Applications 18 may all be considered as objects in their own right.

Figure 3:
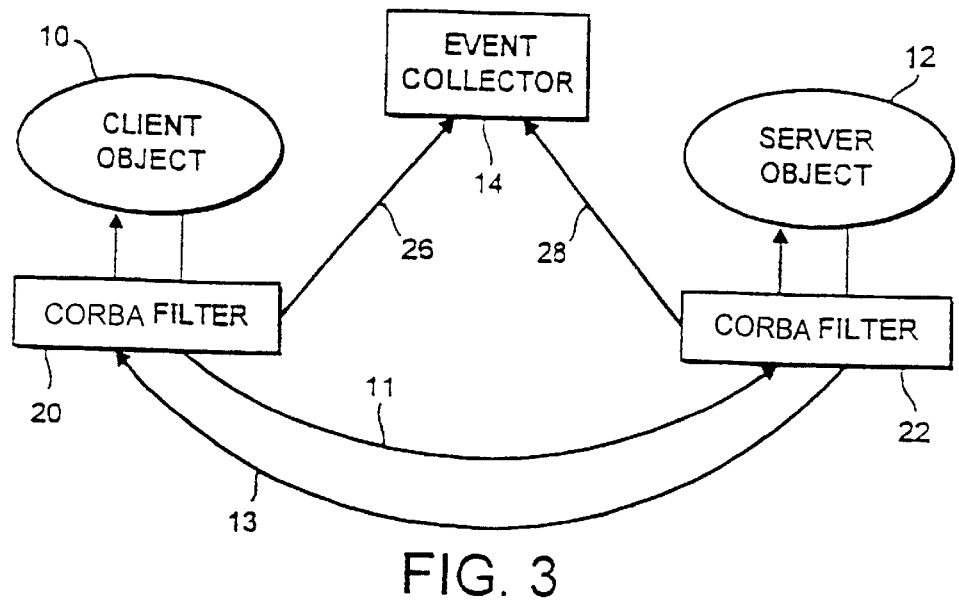
FIG. 3 shows the way in which filters are used to intercept messages being sent and received.

FIG. 3 shows in more detail the interactions between the individual objects and the Event Collection Mechanism 14. For ease of reference, the reference numerals used for those elements corresponding to the RPC model correspond to the numerals used in FIG. 1. As may be seen, the event collector 14 collects events 26,28 which are transmitted by filters 20,22 associated respectively with the client object 10 and the server object 12. The filters themselves may comprise the filters present in the CORBA conformant product Orbix. Orbix is a commercial software product available from Iona Technologies. This allows software to be inserted which will be run during the arrival, dispatch, reply and return of messages (object interactions). Accordingly, the event collector 14 collects information relating to the transmission of a message from one object to another (that is the invocation of an operation on one object by another), or the creation or deletion of an object. The filters are associated with the objects in such a way that they intercept messages being sent and received, but without requiring any changes to the objects themselves.

Figure 4:
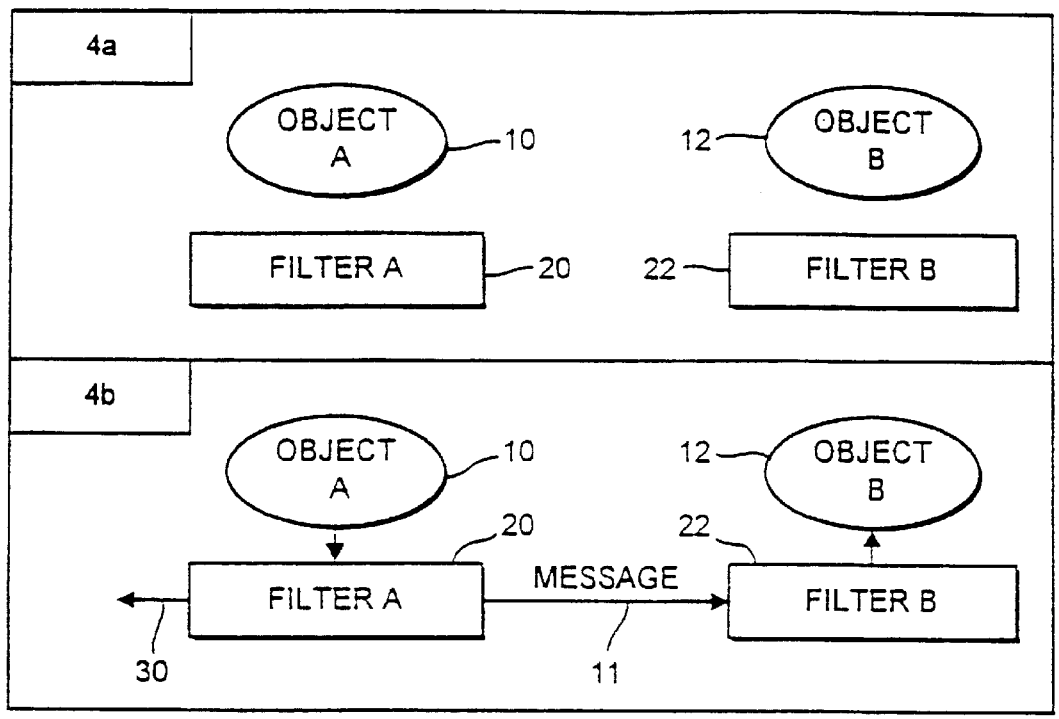
FIG. 4 illustrates the operation of the filters.

FIG. 4 illustrates the operation of the system in practice. FIG. 4a shows the situation before Object A invokes a request on Object B. FIG. 4b shows the situation when the request is invoked. The outgoing message 11 is intercepted by Filter A, and a reporting message 30 is passed on to the Event Collection Mechanism. It will be understood, of course, that when an Object is created or deleted, the corresponding filter will also be created or deleted, thereby enabling an event for this to be generated as well. The Event Collection Mechanism simultaneously collects events from all the active objects within the system.

All of the events collected by the Event Collection Mechanism 14 are then passed on, in a continuous stream, to the Event Dispatch Mechanism 16 (FIG. 2). Of course, collecting information on every message that passes between objects, and on the creation and deletion of every object, is likely to result in information overload. Typically, the user may be interested only in what is happening to particular objects, or to particular classes of objects, and it would therefore be useful to provide some method of establishing which events are of interest. The way in which this is achieved will now be described.

Figure 5:
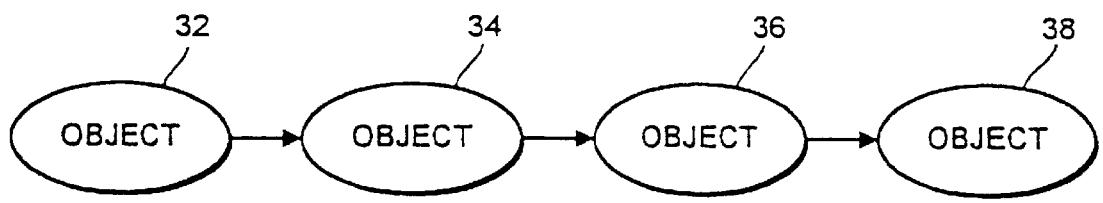
FIG. 5 shows how interactions propagate between objects.

It should first be noted that in a Distributed Object System, when an object in the system interacts with another, further "knock-on" interactions 10 may well ensue. This is illustrated in FIG. 5, in which an interaction between objects 32,34 has created "knock-on" interactions with further objects 36,38. In the preferred embodiment, a mechanism is provided whereby the subsequent "knock-on" interactions may be linked back to the original interaction which triggered them off.

The way in which this is achieved may be seen with reference to FIG. 6. Each object in the system is given the unique key or identifier, this key being stored in association with the respective filter. Then, if an object (say Object A) calls on the services of another object (Object B), the key of Object A is propagated to Object B which takes on this key until it has finished servicing the request of Object A. It then discards the key of Object A, and returns to its own key again.

FIG. 6a illustrates the situation prior to Object A invoking a request on Object B. As will be seen, the filter 20 associated with Object A contains a unique Key A, and the filter 22 associated with the Object B contains a unique Key B.

FIG. 6b shows the situation as Object A invokes a request on Object B. An outgoing message 11 is passed between Object A and Object B, this message being intercepted as previously described by the filter 20 which generates a reporting message 30. The filter 20 attaches to the message 11 its own key, Key A, and that is passed on to the receiving filter 22 which currently contains Key B. When the message containing Key A arrives, the filter 22 takes on Key A in replacement for its original key, and passes the rest of the message on to Object B.

FIG. 6c shows the situation while the request is being serviced by Object B. As will be seen, Object B's filter 22 has now taken on Key A.

FIG. 6d shows what happens when Object B completes the request, and sends back a reply message to Object A. As the message is sent, Object B's filter 22 takes back on its original key, Key B. The reply message is received by the filter 20, and passed on to Object A. Simultaneously, the filter 20 generates a further reporting message 30'. Which is passed on to the Event Collection Mechanism 14 (FIG. 2).

Thus, all of the events which occur as a result of the initial interaction sent from Object A to Object B can be associated via Key A with Object A.

The Event Collection Mechanism understands that all of the reported events emanate from Object A, since both of the reporting messages 30,30' include within them Key A.

A slightly more complex scenario may be seen in FIG. 7, where Object B in turn invokes the services of a third object. Object C.

FIG. 7a shows the situation before Object A invokes a request on Object B.

FIG. 7b shows the situation during the invoking of the request. A reporting message 44, including Key A, is sent to the Event Collection Mechanism informing it of the invoking request.

FIG. 7c shows the situation during the time that Object B is servicing the request of Object A. It will be noted that the filter 22 of Object B has taken on Key A.

FIG. 7d now shows what happens when, prior to control returning to Object A, Object B needs to invoke a request on another object 40 (Object C). Object C has associated with it its own filter 42 which at this point contains Key C. The filter 22 intercepts the message and appends to it its own key which is currently Key A. It also provides a farther reporting message 46 to the Event Collection Mechanism, which itself contains Key A indicating that the initial interaction emanated from Object A.

FIG. 7e shows the situation during the time that Object C is servicing the request from Object B. Object B's filter 22 contains Key A, as does now Object C's filter 42.

FIG. 7f illustrates the sending of the reply back from Object C to Object B. Once the reply has been sent, the filter 42 dispenses with Key A and reverts to its original key, Key C. The filter 22 intercepts the reply message and sends out another reporting message 48 to the Event Collection Mechanism. Again, this contains Key A since it emanates from the filter 22 which currently contains that particular key.

Finally, FIG. 7g shows what happens when Object B completes its request, and returns control back to Object A. The reply message is sent back from Object B to Object A, and Object B's filter 22 takes on again its original key, Key B. On receipt of the reply message, Object A's filter 20 sends out yet another message 50 to the Event Collection Mechanism. Once again, this message will contain the Key A, since that is the key currently associated with the filter 20.

It will be seen, therefore, that the key is propagated from one object to the next, by adding it to the message at the sending filter, and removing it from the message at the receiving filter.

Using this mechanism, it is now possible to select particular events or classes of events for further analysis. For example, if a user of the system wished to visualise the whole sequence of events which had occurred as a result of an interaction emitted from Object A, all he would need to do would be to select only those events having associated with them the relevant key, namely Key A.

Further details will now be given, with reference to FIGS. 8 and 9, on the Event Dispatch Mechanism and its connection with the Visualizer Application.

As events are collected by the Event Collection Mechanism, they are forwarded to the Event Dispatch Mechanism 16. The Event Dispatch Mechanism receives details of all events collected by the Event Collection Mechanism 14, and is arranged to forward those particular events that the user is interested in to the Visualizer Application 18.

As may be seen in FIG. 8, the Event Dispatch Mechanism 16 incorporates within it an object, known as the Event Dispatcher Factory 52, responsible for creating further objects 54 known as Event Dispatchers. Each Event Dispatcher is responsible for sending events to a particular Visualizer Application. A user who wishes to view a particular subset of events runs the Visualizer Application Object 18, which then registers as indicated by numeral 56 with the Event Dispatch Mechanism 16.

As indicated in FIG. 9, several individual instances (objects) of the Visualizer Application 18 may in practice be running at once, each of which has registered with the Event Dispatch Mechanism 16. On each registration, the Event Dispatcher Factory 52 creates a new Event Dispatcher Object 54 which passes information as indicated at 58 to its corresponding Visualizer Application. Each Visualizer Application 18 may be configured differently, and may require information on a different subset of the events which have been collected (or are being collected) by the Event Collection Mechanism 14. The necessary filtering is carried out by the respective Event Dispatcher 54 which passes on only that information which has been requested by its individual Visualizer Application.

The Visualizer Application 18 may take many forms, having a variety of front-ends, the preferred version being illustrated schematically in FIG. 10. The user of the Visualizer Application sees information displayed graphically within a large window 60. Within a workspace 62 of the window are displayed the various objects that the Visualizer Application has been configured to show. Typically, the display will show a plurality of object icons 64, connected by arrows 66. Each icon 64 represents a particular object, with the arrows representing interactions between the objects. Certain of the arrows 67 and/or the object icons 68 may be displayed in a different colour to indicate the active (current) interaction and/or object. In the preferred display, the most recently displayed interaction is shown in red; as another event arrives, that becomes the active interaction and the previous active interaction becomes grey.

The window 60 may further include a tool bar 70 having a status display 72 and a plurality of buttons 74 whereby the user may configure the display to his or her requirements.

The preferred capabilities of the Visualizer Application are set out below:

Configurable Modes (a) Step mode—in this mode, events are stored in a queue at the application, and a counter on the application shows how many events are currently queued. A step button allows the user to move sequentially through the stored events, displaying one for each click of the step button:

(b) Run mode—in this mode the application does not queue the interactions that arrive, but attempts to display them immediately. There is a control which allows the user to pause the display of events, in which case they are temporarily stored in the queue until the play button is pressed. The application imposes a minimum time between the display of events which is configurable by the user.

Live or Recorded Event Streams (a) In live mode, events are received from the event collection and dispatch systems as described above;

(b) in play from file, a sequence of events is fed from a stored file;

(c) In record to file, a live sequence of events id displayed, and at the same time, recorded into a file for playback at a later date.

Configuration of Display

The Visualizer Application can be configured by loading in a configuration file which contains information about:

(a) Objects—the configuration file allows the user to configure which objects are to be displayed, what position they are to be displayed in, what colour should be used for the object, and what category of display behaviour it should conform to;

(b) Events—the configuration file also allows the user to configure which incoming events are to be displayed, and what user-friendly name should be displayed by each event.

Configuration of Key

This allows the user to receive events which occur as a result of actions taken by an object (or set of objects) which has been configured with a certain key.

Interactions are displayed on the screen only if all four of the following criteria are met:

(a) Interactions must have the same key as that which was configured into the Visualizer Applications (unless no key has been configured);

(b) Interactions must originate from an object which has been configured to be of interest;

(c) Interactions must terminate at an object which has been configured to be of interest;

(d) Interactions must have a message name which has been configured to be of interest.

As mentioned above, objects may be configured to conform to certain behaviours. The following behaviour types are exemplary, and additional types may be added at any time by modifying the Visualizer Application:

Type 1 object—This type of object is always visible on the screen of the Visualizer Application.

Type 2 object—This type of object becomes visible when an event is received that tells the Visualizer Application that the object has been created, and becomes hidden when an event arrives that corresponds to the deletion of the object.

Type 3 object—This type of object becomes visible when an interaction is displayed that goes to the object, but is hidden by the arrival of a deletion event.

In other embodiments (not shown) the Visualizer Application 18 may be replaced by other objects that can make use of the information collected by the Event Collection Mechanism. For example, a Fault-Reporting Application could provide for fault-monitoring of a Distributed Object System. Such an application might include the production of system alarms where unexpected events have occurred, along with error-recovery objects designed to modify the operation of the system in the event of an alarm. The system could, for instance, be closed down entirely automatically in appropriate circumstances, or other fault-recovery objects could be run. The system of the present invention may therefore be useful not only to system designers and maintainers, but also as a means of monitoring an Operational Distributed Object System.

In yet a further embodiment (not shown) the Visualizer Application may be replaced with a Charging Application. The events collected by the Event Collection Mechanism may then be used to charge for the use of objects or services.

Reference will now be made to FIG. 11, which illustrates the infrastructure aspects of the engineering model defining the preferred Distributed Processing Environment (DPE). The DPE is an infrastructure (of a type known per se) that supports the interactions of the various objects previously discussed. The purpose of the DPE is, amongst other things, to shield the application programs from the heterogeneous and distributed nature of the underlying environment, and to provide a mechanism that allows objects to interact without a knowledge of the details of the particular computing node the are active on. The DPE defines four types of entity: a DPE kernel 811, a kernel transport network 901, DPE stubs, and DPE servers 809. The kernel transport network 901 is linked as shown in the Figure with a plurality of interlinked computing nodes 810.

The DPE kernel defines a core set of communications, storage and processing capabilities (for example a protocol stack) which is assumed to be present on each node.

The kernel transport network 901 is a communications network to which all DPE kernels are attached in order to exchange messages to facilitate object interaction. It is defined in order logically to separate the computing network from a transport network which may be used for the transmission of voice and video. The logical separation recognises that the two networks may have different requirements on quality of service.

The DPE servers 809 provide infrastructure support, for example in the form of a trader and a notification server. A trader provides a run-time mechanism that allows objects to locate the interfaces of other objects. A notification server enables objects to emit notifications (for example significant events that occur during the lifetime of an object) to other objects. Objects wishing to receive notifications register at run-time with the notification server.

Referring now to FIG. 12, there is shown a hardware view of a system on which embodiments of the present invention might operate. The hardware is based around a transport network 1100 which will carry the data services provided by service providers to individual users of the system. The data transmitted across the network 1100 might include, for example, voice and/or video information. Individual users are connected to the network by different pieces of customer premises equipment (CPE) 1101, 1102. The various parties involved in offering and carrying the network services, such as service retailers, service providers and network providers, are connected to the transport network at a computational node 810. Each computational node 810 includes a variety of hardware and software features, indicated generally at 812. These include a DPE kernel 811, a protocol stack for use according to DPE principles, storage facilities 1121 and applications 1120 running at the computational node.

The system will also include a variety of data stores 1105, 1106 coupled to the transport network, as shown. One of these data stores 1105 may comprise a management information data store, to provide global management information in respect of services provided by the network.

It will of course be understood that with the hardware shown in FIG. 12, an instance of the visualiser application 18 (FIG. 2) may be run at any of the individual computational nodes 810. The application will collect information from distributed objects across the network, and may report by way of the information screen shown in FIG. 10 at the individual operator's own terminal.

What is claimed is:

1. A system for visualizing objects within a distributed object system, the system comprising:
a plurality of objects, each object having an associated filter arranged to intercept messages sent or received by its corresponding object and to forward information representative of said messages to an event collector in addition to forwarding on said messages to their respective destinations; and
a visualizer application operatively coupled to the event collector and arranged to receive the information from said event collector and having a graphical front-end for displaying to a user a graphical representation of the distributed object system, the visualizer application being user configurable to display a selected category of objects within the system.

2. A system as claimed in claim 1 in which at least one filter is further arranged to forward information to the event collector on the creation or deletion of a corresponding object.

3. A system as claimed in claim 1 in which the objects includes at least one client object wherein each client object has an associated client filter, the client filter having a client key which is representative of the client object.

4. A system as claimed in claim 3 in which when the client object sends an outgoing message to a server object invoking the server object, the client filter forwards information representative of the client key to the event collector.

5. A system as claimed in claim 3 in which when the client object sends an outgoing message to a server object invoking the server object, the client filter adds to the outgoing message information representative of the client key.

6. A system as claimed in claim 5 in which the outgoing message is received by a server filter associated with the server object, the server filter being arranged to replace a server key with the client key on receipt of the outgoing message.

7. A system as claimed in claim 6 in which when the server object sends a reply message to the client object returning control to the client object, the server filter replaces the client key with the server key.

8. A system as claimed in claim 7 in which the reply message is received by the client filter, the client filter being arranged to forward further information representative of the client key to the event collector.

9. A system as claimed in claim 1 in which the plurality of objects are themselves arranged to interact as the distributed object system, independently of the filters; the filters being associated with, but not altering any code of, the objects.

10. A system as claimed in claim 1 in which the information forwarded to the event collector includes information identifying a base object, the base object being the first instigator of an outgoing server-invoking message which has ultimately resulted in the intercepted message.

11. A system as claimed in claim 1 in which the filter is CORBA-compliant.

12. A system as claimed in claim 1 in which events collected by the event collector are processed by an event dispatch mechanism and are forwarded to the visualizer application.

13. A system as claimed in claim 12 in which the event dispatch mechanism is arranged to forward to the visualizer application only events of interest to the user.

14. A system as claimed in claim 12 in which the event collector is arranged to forward processed events to a plurality of separate visualizer applications.

15. A system as claimed in claim 14 in which the separate visualizer applications are concurrently-running objects.

16. A system as claimed in claim 12 in which the visualizer application is a control application, arranged to control application of the distributed object system based on events received.

17. A system as claimed in claim 12 in which the visualizer application is a charging application, arranged to charge individual users of the distributed object system based on events received.

18. A system as claimed in claim 12 in which the visualizer application is arranged to register with the event dispatch mechanism.

19. A system as claimed in claim 18 in which an event dispatcher factory of the event dispatcher mechanism is arranged to create an event dispatcher for each registration of the visualizer application with the event dispatcher mechanism, the event dispatcher being arranged to forward events to its respective visualizer application based on a configuration of the said respective visualizer application.

20. A method of characterising a distributed object system having a plurality of objects, the method comprising:
providing each object with an associated filter which is arranged to intercept messages sent or received by its corresponding object and to forward information representative of said messages to an event collector in addition to forwarding on said messages to their respective destinations, the distributed object system being characterised according to the messages received by the event collector; and
providing the information to a visualizer application, operatively coupled to the event collector to receive the information from the event collector, having a graphical front-end for displaying to a user a graphical representation of the distributed object system, the visualizer application being user configurable to display a selected category of objects within the system.

* * * * *